United States Patent
Tsuyama

(10) Patent No.: US 6,769,781 B2
(45) Date of Patent: Aug. 3, 2004

(54) REMOTE CONTROL MIRROR APPARATUS FOR AUTOMOBILE

(75) Inventor: Osamu Tsuyama, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 0 days.

(21) Appl. No.: 10/200,033

(22) Filed: Jul. 22, 2002

(65) Prior Publication Data

US 2003/0018418 A1 Jan. 23, 2003

(30) Foreign Application Priority Data

Jul. 23, 2001 (JP) ........................................ 2001-222238

(51) Int. Cl.[7] .............................................. G02B 7/182
(52) U.S. Cl. ........................ 359/874; 359/877; 248/479
(58) Field of Search ................................. 359/872, 873, 359/874, 876, 877; 248/476, 479

(56) References Cited

U.S. PATENT DOCUMENTS

| 4,498,738 A | * | 2/1985 | Kumai ........................ 359/874 |
| 4,696,555 A | | 9/1987 | Enomoto |
| 4,940,321 A | | 7/1990 | Yoshida |
| 5,226,034 A | * | 7/1993 | Nagayama et al. .......... 359/873 |
| 5,343,333 A | * | 8/1994 | Nagayama et al. .......... 359/874 |
| 6,058,553 A | * | 5/2000 | Tsuyama et al. ........ 15/250.003 |

FOREIGN PATENT DOCUMENTS

JP    2000-118304    4/2000

* cited by examiner

Primary Examiner—Mark A. Robinson
(74) Attorney, Agent, or Firm—Foley & Lardner LLP

(57) ABSTRACT

A stopper to be contacted with a moving rod before it is located at the most receded position such that the elastic engagement between a female screw and an elastic engaging nail is in the state capable of clutch slipping is provided between a housing and the moving rod. A fall-off preventing unit to be contacted with the moving rod at the time the moving rod is located at the most advanced position is provided for preventing fall-off of the moving rod from the other member between the moving rod and another member.

13 Claims, 5 Drawing Sheets

REMOTE CONTROL MIRROR APPARATUS FOR AUTOMOBILE

BACKGROUND OF THE INVENTION

1) Field of the Invention

The present invention relates to a remote control mirror for automobiles, such as a door mirror, a fender mirror, and a rearview mirror. In the claims and the specification, the "right and left" or the "right and left direction" refers to the "right and left" or the "right and left direction" around the vertical axis with the remote control mirror mounted on an automobile. Moreover, the "up and down" or the "up and down direction" refers to the "right and left" or the "right and left direction" around the horizontal axis with the remote control mirror mounted on the automobile.

2) Description of the Related Art

Conventional remote control mirror for automobiles have been disclosed in the U.S. Pat. No. 4,696,555, U.S. Pat. No. 4,940,321 and the Japanese Patent Application Laid-Open (JP-A) No. 2000-118304.

A remote control mirror generally comprises a power unit and a mirror unit mounted on the power unit tiltably. The power unit comprises a housing, a motor housed in the housing, a moving rod mounted on the housing movably and interlocked with the mirror unit, a deceleration mechanism and a moving mechanism provided between the motor and the moving rod. When the motor is driven by the remote control, the moving rod is moved via the deceleration mechanism and the moving mechanism so as to tilt the mirror unit.

In the remote control mirror, it is important that the load on the motor or the deceleration mechanism can be alleviated at the time the moving rod is disposed at the most receded position, and that slip off of the moving rod from the other members can be prevented at the time the moving rod is disposed at the most advanced position.

SUMMARY OF THE INVENTION

It is an object of the present invention to provide a remote control mirror, which can alleviate the load on a motor or a deceleration mechanism at the time a moving rod is disposed at the most receded position, and can prevent slip off of the moving rod from the other members at the time the moving rod is disposed at the most advanced position.

The remote control mirror according to one aspect of the invention comprises a stopper to be contacted with the moving rod before it is located at the most receded position such that the elastic engagement between a female screw and an elastic engaging nail is in the state capable of clutch slipping, between the housing and the moving rod. As a result, according to the above aspect, since the elastic engagement between the female screw and the elastic engaging nail can be clutch slipped before the moving rod is located at the most receded position, the load on the motor or the deceleration mechanism can be alleviated at the time the moving rod is located at the most receded position.

The remote control mirror according to another aspect of the invention comprises a fall-off preventing unit to be contacted with the moving rod at the time the moving rod is located at the most advanced position for preventing fall-off of the moving rod from the other member between the moving rod and another member. As a result, according to the above aspect, since the fall-off preventing unit is contacted with the moving rod when it is located at the most advanced position, fall-off of the moving rod from the other member can be prevented at the time the moving rod is located at the most advanced position.

These and other objects, features and advantages of the present invention are specifically set forth in or will become apparent from the following detailed descriptions of the invention when read in conjunction with the accompanying drawings.

DETAILED DESCRIPTIONS

Embodiment(s) of the remote control mirror according to the present invention will be explained with reference to the accompanied drawings. The remote control mirror in this embodiment is an example used for a door mirror apparatus. The present invention is not limited by this embodiment.

Figure 1:
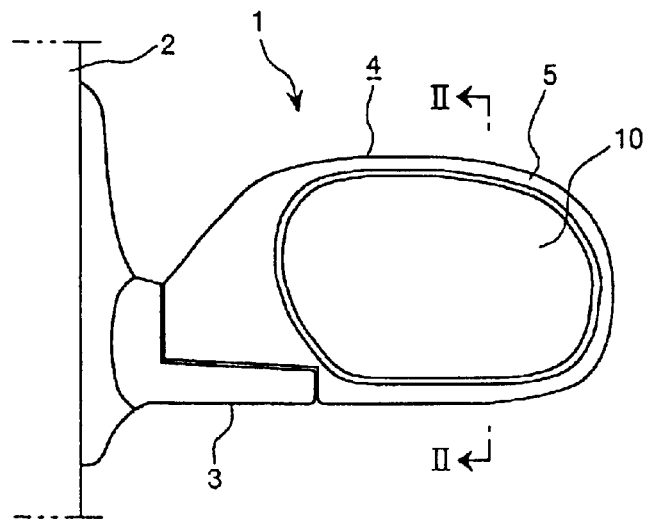
FIG. 1 is a perspective view of a door mirror apparatus of an embodiment of a remote control mirror according to the present invention.
Figure 2:
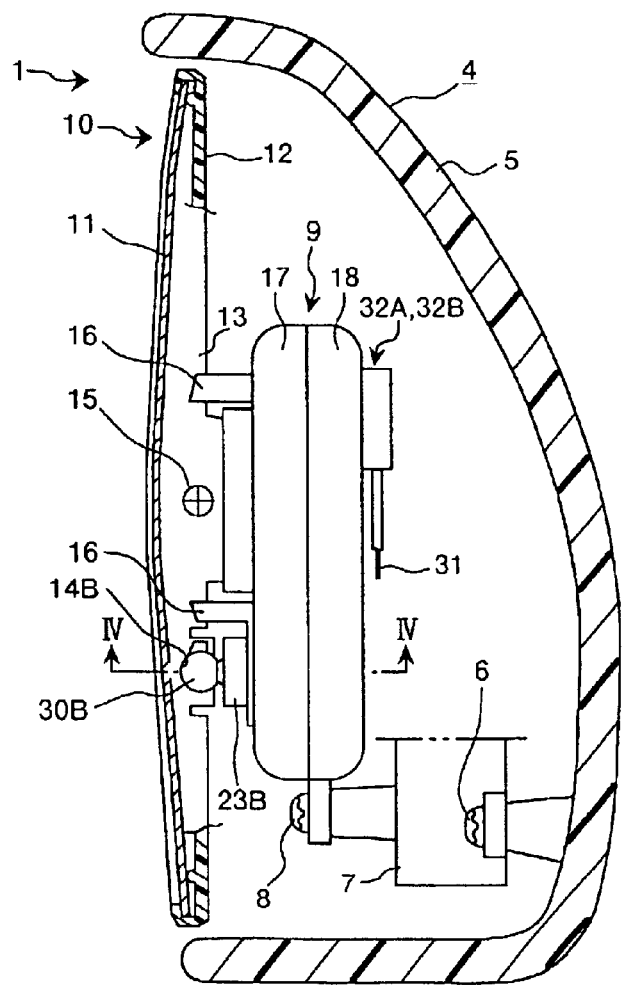
FIG. 2 is a cross-sectional view taken on the line II—II of FIG. 1.

The remote control mirror shown in FIGS. 1 and 2 is a so-called door mirror apparatus 1. The door mirror apparatus 1 comprises a base 3 fixed on a door 2 of an automobile and a mirror assembly 4 mounted tiltably around the substantially vertical axis of the base 3. As the remote control mirror, in addition to the door mirror apparatus 1, a fender mirror apparatus, a rearview mirror apparatus, or the like can be included.

As shown in FIG. 2, the mirror assembly 4 comprises a mirror housing 5, a unit bracket 7 mounted on the mirror housing 5 by a screw 6, or the like, a power unit 9 mounted on the unit bracket 7 by a screw 8, or the like and a mirror unit 10 mounted on the power unit 9 tiltably.

Similarly, as shown in FIG. 2, the mirror unit 10 comprises a mirror body 11, a mirror holder 12 which supports the mirror body 11, and a mirror holder base 13 mounted on the center part of the mirror holder 12.

Figure 3A:
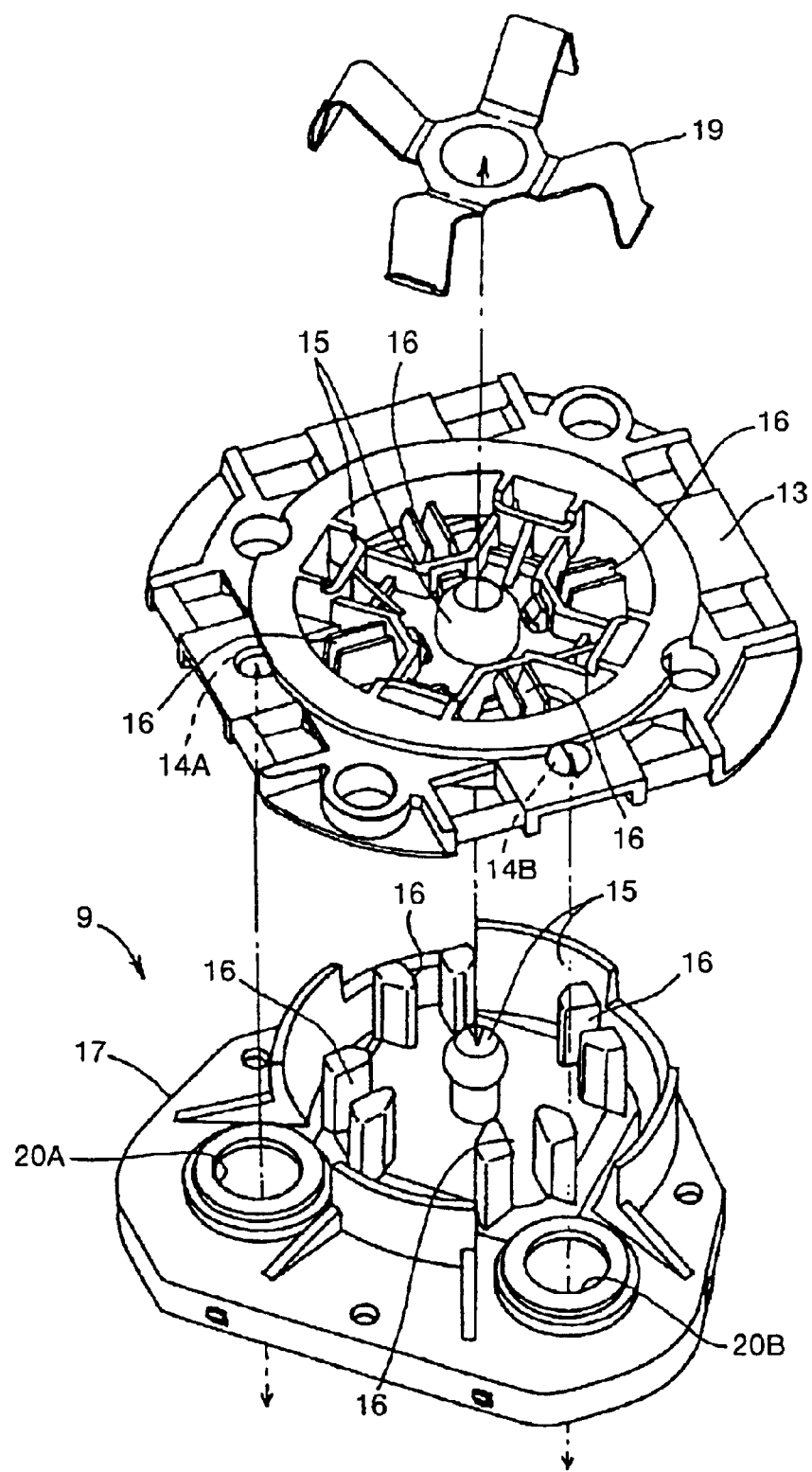
FIG. 3A is an exploded perspective view of a spring, a holder base, and a first housing of a power unit of the remote control mirror.

As shown in FIG. 3A, the mirror holder base 13 is provided with a spherical recess portion 14A for the right and left direction, a recess portion 14B for the up and down direction (hereinafter referred to as the spherical recess portions 14A, 14B), a pivot mechanism 15 and a guide mechanism 16, respectively. The mirror holder 12 and the mirror holder base 13 are provided as individual structures such that an integral structure can be provided by assembling the mirror holder base 13 in the center part of the mirror holder 12. In the present invention, the mirror holder 12 and the mirror holder base 13 can be provided as an integral structure.

Figure 3B:
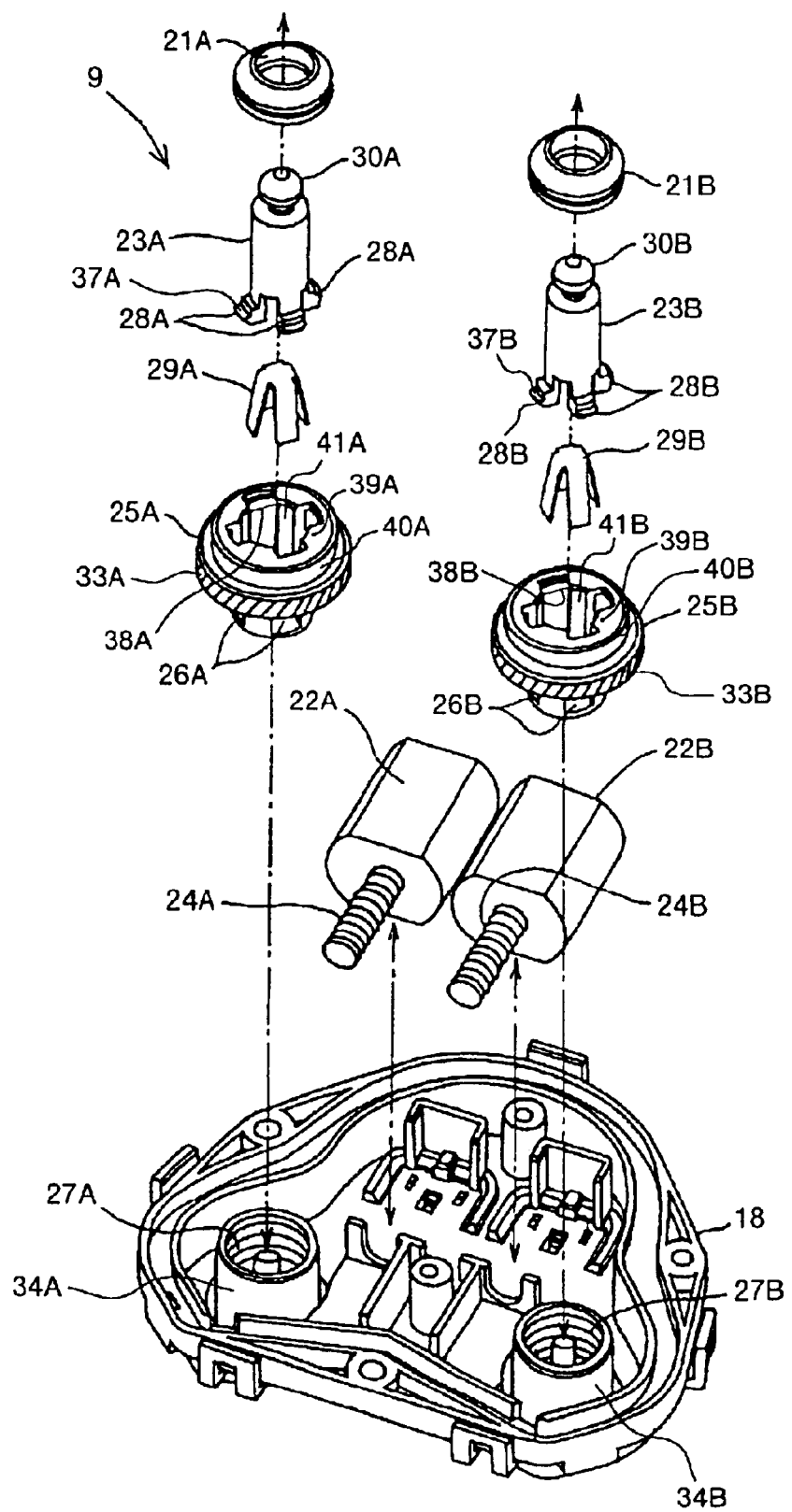
FIG. 3B is an exploded perspective view of the power unit of the remote control mirror.

In contrast, as shown in FIGS. 2, 3A and 3B, the power unit 9 comprises a first housing 17, a second housing 18

(hereinafter referred to as the housings 17, 18), and other components described later.

The first housing 17 is provided with the pivot mechanism 15 and the guide mechanism 16, respectively. The mirror holder base 13 is mounted on the first housing 17 of the power unit 9 via a spring 19, the pivot mechanism 15 and the guide mechanism 16 tiltably in the right and left direction and the up and down direction. The spring 19 may be one with a cross-like shape formed integrally, or one comprising two pieces with a minus shape in a combination so as to form a cross-like shape.

The first housing 17 is provided with a round opening 20A for the right and left direction and an opening 20B for the up and down direction (hereinafter referred to as the openings 20A, 20B), respectively. A round ring-like packing 21A for the right and left direction and a packing 21B for the up and down direction (hereinafter referred to as the packings 21A, 21B) are mounted on the rim of the openings 20A, 20B, respectively.

A motor 22A for the right and left direction and a motor 22B for the up and down direction (hereinafter referred to as the motors 22A, 22B) are stored in the housings 17, 18, respectively. Moreover, a moving rod 23A for the right and left direction, and a moving rod 23B for the up and down direction (hereinafter referred to as the moving rods 23A, 23B) are mounted movably in the housings 17, 18, respectively. The moving rods 23A, 23B are inserted through the openings 20A, 20B. The packings 21A, 21B are disposed water-tightly between the outer side surface of the moving rods 23A, 23B and the rim of the openings 20A, 20B.

A deceleration mechanism for the right and left direction, a deceleration mechanism for the up and down direction (hereinafter referred to as the deceleration mechanism), a moving mechanism for the right and left direction and a moving mechanism for the up and down direction (hereinafter referred to as the moving mechanism) are provided between the moving rods 23A, 23B and the motors 22A, 22B, respectively.

Figure 4:
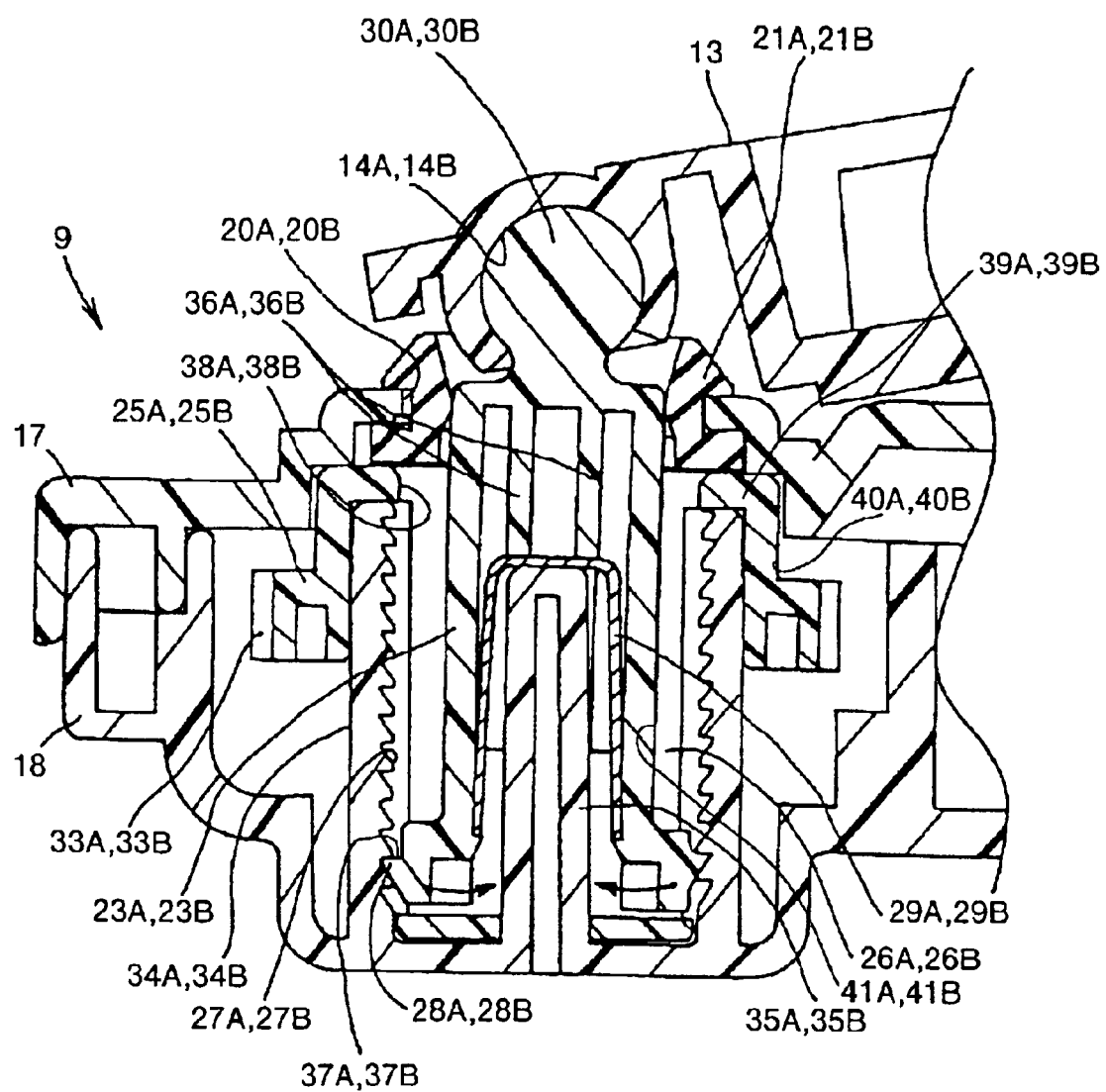
FIG. 4 is a cross-sectional view taken on the line IV—IV of FIG. 2 at the time the moving rod is located at the most receded position.
Figure 5:
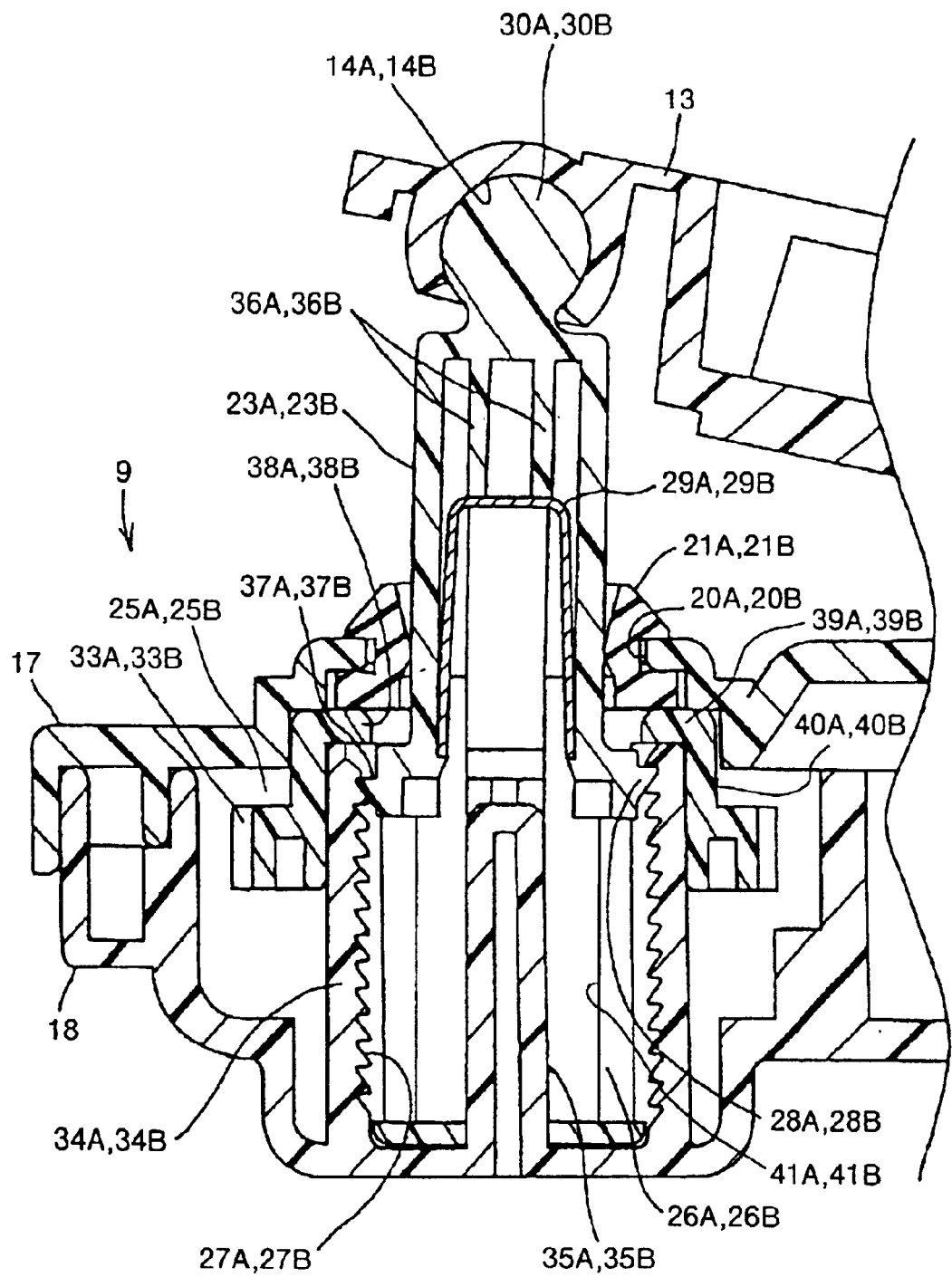
FIG. 5 is a cross-sectional view taken on the line IV—IV of FIG. 2 at the time the moving rod is located at the most advanced position.

The moving rods 23A, 23B are made of a resin with elasticity. As shown in FIGS. 4 and 5, the moving rods 23A, 23B have a cylindrical shape with hollowness from one end to halfway at the other end. On one end of the moving rods 23A, 23B, four elastic engaging nails 28A for the right and left direction and elastic engaging nails 28B for the up and down direction (hereinafter referred to as the elastic engaging nails 28A, 28B) are provided toward the outer side by a substantially equal interval, respectively. Moreover, on the other end of the moving rods 23A, 23B, a spherical portion 30A for the right and left direction and a spherical portion 30B for the up and down direction (hereinafter referred to as the spherical portions 30A, 30B) are provided integrally.

As shown in FIG. 3B, the deceleration mechanism comprises a worm 24A for the right and left direction and a worm 24B for the up and down direction (hereinafter referred to as the worms 24A, 24B) mounted each on the rotation axes of the motors 22A, 22B, and a helical gear 25A for the right and left direction and a helical gear 25B for the up and down direction (hereinafter referred to as the helical gears 25A, 25B) to be engaged each with the worms 24A, 24B.

As shown in FIGS. 4 and 5, the helical gears 25A, 25B comprise a hollow double cylindrical shape, that is, an outer side cylindrical portion 40A for the right and left direction, an outer side cylindrical portion 40B for the up and down direction (hereinafter referred to as the outer side cylindrical portions 40A, 40B), an inner side cylindrical portion 41A for the right and left direction, and an inner side cylindrical portion 41B for the up and down direction (hereinafter referred to as the inner side cylindrical portions 41A, 41B). The axial direction lengths of the outer side cylindrical portions 40A, 40B is shorter than the axial direction lengths of the inner side cylindrical portions 41A, 41B.

A gap between one end of the outer side cylindrical portions 40A, 40B and one end of the inner side cylindrical portions 41A, 41B is interlocked integrally via an interlocking portion 39A for the right and left direction and an interlocking portion 39B for the up and down direction (hereinafter referred to as the interlocking portions 39A, 39B), respectively. The outer side surface of the outer side cylindrical portions 40A, 40B is provided with a gear 33A for the right and left direction of the helical gear and a gear 33B for the up and down direction, respectively. In contrast, four long hole-like transmission holes 26A for the right and left direction and transmission holes 26B for the up and down direction (hereinafter referred to as the transmission holes 26A, 26B) are provided from one end to the other end of the inner side cylindrical portions 41A, 41B each in the axial direction (moving direction of the moving rods 23A, 23B). The four transmission holes 26A, 26B and the four elastic engaging nails 28A, 28B correspond with each other.

As shown in FIGS. 3B, 4 and 5, the moving mechanism comprises a female screw 27A for the right and left direction provided in the second housing 18, a female screw 27B for the up and down direction (hereinafter referred to as the female screws 27A, 27B), the elastic engaging nails 28A, 28B of the moving rods 23A, 23B, a spring 29A for the right and left direction and a spring 29B for the up and down direction (hereinafter referred to as the springs 29A, 29B). As shown in FIGS. 3 and 4, the female screws 27A, 27B are provided each on the inner side surface of a hollow cylindrical portion 34A for the right and left direction and a hollow cylindrical portion 34B for the up and down direction (hereinafter referred to as the hollow cylindrical portions 34A, 34B) provided integrally with the second housing 18.

The inner diameter of the outer side cylindrical portions 40A, 40B and the outer diameter of the hollow cylindrical portions 34A, 34B are substantially equal. Moreover, the outer diameter of the inner side cylindrical portions 41A, 41B is smaller than the inner diameter of the hollow cylindrical portions 34A, 34B, that is, the inner diameter of the screw thread of the female screws 27A, 27B.

As shown in FIGS. 4 and 5, the outer side cylindrical portions 40A, 40B of the helical gears 25A, 25B are supported each by the hollow cylindrical portions 34A, 34B rotatably. The inner side cylindrical portions 41A, 41B of the helical gears 25A, 25B are stored each in the hollow cylindrical portions 34A, 34B rotatably. The interlocking portions 39A, 39B of the helical gears 25A, 25B are held and mounted unmovably in the moving direction of the moving rods 23A, 23B between the hollow cylindrical portions 34A, 34B and the first housing 17.

As a result, the helical gears 25A, 25B are mounted rotatably on the housings 17, 18 and unmovably in the moving direction of the moving rods 23A, 23B.

As shown in FIGS. 4 and 5, the outer diameter of the moving rods 23A, 23B and the inner diameter of the inner side cylindrical portions 41A, 41B are substantially equal. The moving rods 23A, 23B are supported in the inner side cylindrical portions 41A, 41B of the helical gears 25A, 25B movably in the moving direction of the moving rods 23A, 23B. Moreover, the springs 29A, 29B are disposed in the moving rods 23A, 23B. Furthermore, according to their own elastic function and the spring function of the springs 29A, 29B, the elastic engaging nails 28A, 28B are always elastically engaged with the female screws 27A, 27B through the transmission holes 26A, 26B, respectively.

According to the contact of the side wall surface of the elastic engaging nails 28A, 28B and the side wall surface of the transmission holes 26A, 26B, the moving rods 23A, 23B and the helical gears 25A, 25B are rotated synchronously. Moreover, when the elastic engaging nails 28A, 28B are always elastically engaged with the female screws 27A, 27B according to the elastic function of the elastic engaging nails 28A, 28B themselves, the springs 29A, 29B need not always be provided. Furthermore, the elastic engaging nails 28A, 28B are movable in the moving direction of the moving rods 23A, 23B (axial direction of the helical gears 25A, 25B) in the transmission holes 26A, 26B.

As a result, the moving rods 23A, 23B are mounted on the housing 17, 18 rotatably and movably. That is, when the motors 22A, 22B are driven, the moving rods 23A, 23B and the helical gears 25A, 25B are rotated synchronously. According to the rotation, by the screw feeding function of the elastic engaging nails 28A, 28B and the female screws 27A, 27B, the moving rods 23A, 23B are moved while rotating with respect to the housings 17, 18. In contrast, since the helical gears 25A, 25B cannot move with respect to the housings 17, 18, they can only be rotated.

The moving rods 23A, 23B are maintained water-tightly by the packings 21A, 21B. Moreover, the spherical portions 30A, 30B of the moving rods 23A, 23B and the spherical recess portions 14A, 14B of the mirror holder base 16 are fitted with each other. Thereby, the mirror holder base 13 can be tilted in the right and left direction and the up and down direction.

A stopper is provided between the second housing 18 and the moving rods 23A, 23B. As shown in FIGS. 4 and 5, the stopper comprises pins 35A, 35B provided concentrically and integrally with the hollow cylindrical portions 34A, 34B in the second housing 18, and projection portions 36A, 36B integrally in the hollow parts of the moving rods 23A, 23B from the other end to the halfway.

The pins 35A, 35B are inserted into the hollow parts of the moving rods 23A, 23B so as to face the projection portions 36A, 36B with respect to the moving direction of the moving rods 23A, 23B. The springs 29A, 29B are disposed between the moving rods 23A, 23B and the projection portions 36A, 36B.

The stopper comprising the pins 35A, 35B and the projection portions 36A, 36B are contacted via the springs 29A, 29B before the moving rods 23A, 23B are located at the most receded position so that elastic engagement of the female screws 27A, 27B and the elastic engaging nails 28A, 28B can be in the state capable of clutch slipping. The most receded position denotes the position whereat the lower end surface of the moving rods 23A, 23B is contacted with the bottom surface of the inner side cylindrical portions 41A, 41B of the helical gears 25A, 25B (or the bottom surface of the second housing 18).

A fall-off preventing unit is provided between the moving rods 23A, 23B and another member, in this embodiment, the helical gears 25A, 25B. As shown in FIGS. 3B, 4 and 5, the fall-off preventing unit comprises step portions 37A, 37B provided on the upper surface of the elastic engaging nails 28A, 28B, and protruding portions 38A, 38B provided on one end of the through holes 26A, 26B of the helical gears 25A, 25B. The protruding portions 38A, 38B may be provided on the first housing 17 side as well.

The fall-off preventing unit comprising the step portions 37A, 37B and the protruding portions 38A, 38B are for preventing fall-off of the moving rods 23A, 23B from the helical gears 25A, 25B (housings 17, 18) by contacting with the moving rods 23A, 23B at the time they are located at the most advanced position.

As shown in FIG. 2, by connecting two male connector 32A for the right and left direction and male connector 32B for the up and down direction each with the power unit 9 as a female connector, the power unit 9 and a harness 31 on the power source side can be connected electrically so that the motors 22A, 22B can be in the state capable of being energized.

An operation of the remote control mirror according to this embodiment will be explained hereinafter.

The motor 22A for the right and left direction is energized by the remote control from the driver's seat of the automobile. Then, the motor 22A for the right and left direction is driven so that the moving rod 23A for the right and left direction is moved. According thereto, the mirror unit 10 is tilted with respect to the power unit 9 via the mirror holder base 13 in the right and left direction around the vertical axis (not shown) through the center of the pivot mechanism 15. Or when the motor 22B for the up and down direction is energized, the motor 22B for the up and down direction is driven so that the moving rod 23B for the up and down direction is moved. According thereto, the mirror unit 10 is tilted with respect to the power unit 9 via the mirror holder base 13 in the up and down direction around the horizontal axis (not shown) through the center of the pivot mechanism 15.

The effects obtained by the remote control mirror according to this embodiment are as follows.

As shown in FIG. 4, the moving rods 23A, 23B are receded so as to be located at a position before the most receded position. Thereby, the pins 35A, 35B of the stopper and the projection portions 36A, 36B are contacted via the springs 29A, 29B. As a result, the elastic engagement of the female screws 27A, 27B and the elastic engaging nails 28A, 28B can be in the state capable of clutch slipping.

That is, in the state with the pins 35A, 35B of the stopper and the projection portions 36A, 36B contacted via the springs 29A, 29B, the moving rods 23A, 23B are to be further receded. Thereby, the driving force of the motors 22A, 22B is transmitted to the helical gears 25A, 25B via the worms 24A, 24B. The helical gears 25A, 25B and the moving rods 23A, 23B are to be rotated synchronously. Moreover, the elastic engaging nails 28A, 28B are to be screw swirled along the female screws 27A, 27B.

Then, the elastic engaging nails 28A, 28B are deflected in the arrow direction in FIG. 4, resisting to their own elastic function and the spring function of the springs 29A, 29B so as to move over the screw threads of the female screws 27A, 27B. According thereto, the elastic engagement of the female screws 27A, 27B and the elastic engaging nails 28A, 28B is released. Then, the elastic engaging nails 28A, 28B restore automatically in the direction opposite to the arrow in FIG. 4 by their own elastic function and the spring function of the springs 29A, 29B so as to be engaged with the female screws 27A, 27B again.

Thereby, the load on the deceleration mechanism (worms 24A, 24B and the helical gears 25A, 25B), and the motors 22A, 22B can be alleviated at the time the moving rods 23A, 23B are located at the most receded position.

FIG. 5 shows the state with the moving rods 23A, 23B disposed at a position before the most advanced position, that is, the state just before contacting the step portions 37A, 37B of the fall-off preventing member and the protruding portions 38A, 38B. From the state shown in FIG. 5, the moving rods 23A, 23B are further advanced so as to be located at the most advanced position. Then, the step portions 37A, 37B of the fall-off preventing member and the protruding portions 38A, 38B are contacted. As a result, fall-off of the moving rods 23A, 23B from the helical gears 25A, 25B (or the housings 17, 18 as another member) can be prevented.

According to this embodiment, since the inner diameter of the outer side cylindrical portions 40A, 40B and the outer diameter of the hollow cylindrical portions 34A, 34B are substantially equal, the outer side cylindrical portions 40A, 40B of the helical gears 25A, 25B can be supported certainly rotatably around the hollow cylindrical portions 34A, 34B without backlash. In contrast, since the outer diameter of the moving rods 23A, 23B and the inner diameter of the inner side cylindrical portions 41A, 41B are substantially equal, the moving rods 23A, 23B can be supported certainly movably in the inner side cylindrical portions 41A, 41B of the helical gears 25A, 25B without backlash.

In this embodiment, the stopper comprises the pins 35A, 35B provided in the second housing 18 and the projection portions 36A, 36B provided in the moving rods 23A, 23B. However, according to the present invention, a stopper other than the pins 35A, 35B, and projection portions 36A, 36B can be used as well, as long as it is provided between the housings 17, 18 and the moving rods 23A, 23B.

In this embodiment, the fall-off preventing unit comprises the step portions 37A, 37B provided in the elastic engaging nails 28A, 28B and the protruding portions 38A, 38B provided in the helical gears 25A, 25B. However, according to the present invention, a fall-off preventing unit other than the step portions 37A, 37B and the protruding portions 38A, 38B may be used as well, as long as it is provided between the moving rods 23A, 23B and another member.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2001-222238, filed Jul. 23, 2001, which is incorporated herein by reference in its entirety.

What is claimed is:

1. A remote control mirror for an automobile comprising:
a power unit;
a mirror unit mounted on the power unit, the mirror unit being rotated by the power unit by remote control, the power unit including:
 a housing;
 a motor housed in the housing;
 a moving rod mounted movably in the housing and interlocked with the mirror unit; and
 a deceleration mechanism and a moving mechanism provided between the motor and the moving rod for moving the moving rod by the drive of the motor and for tilting the mirror unit, the moving mechanism having:
  a female screw provided in the housing; and
an elastic engaging nail provided in the moving rod such that the elastic engaging nail is elastically engaged with the female screw; and
stopper members provided between the housing and the moving rod, the stopper members abutting against each other before the moving rod is located at a most receded position, such that the elastic engagement between the female screw and the elastic engaging nail is in a state capable of clutch slipping.

2. The remote control mirror according to claim 1, wherein the deceleration mechanism comprises a hollow double cylindrical shaped helical gear such that the helical gear is mounted rotatably and unmovably in a moving direction of the moving rod on a hollow cylindrical portion provided in the housing, with an inner diameter of an outer side cylindrical portion of the helical gear and an outer diameter of the hollow cylindrical portion being substantially equal, and an outer diameter of an inner side cylindrical portion of the helical gear being smaller than an inner diameter of the hollow cylindrical portion,
the moving rod is supported movably in the inner side cylindrical portion, with the outer diameter of the moving rod and an inner diameter of the inner side cylindrical portion being substantially equal,
the female screw is provided on an inner side surface of the hollow cylindrical portion, a long transmission hole is provided in the inner side cylindrical portion in the moving direction of the moving rod, with the elastic engaging nail being elastically engaged with the female screw through the transmission hole, and the moving rod is moved while being synchronously rotated with the helical gear.

3. The remote control mirror according to claim 1, wherein the stopper members comprise a pin provided in the housing, and a projection portion provided in a hollow part of the moving rod with a hollow shape such that the pin is inserted in the hollow part of the moving rod so as to face the projection portion with respect to the moving direction of the moving rod.

4. The remote control mirror according to claim 1, wherein the deceleration mechanism comprises a hollow double cylindrical shaped helical gear such that the helical gear is mounted rotatably and unmovably in a moving direction of the moving rod on a hollow cylindrical portion provided in the housing, with an inner diameter of an outer side cylindrical portion of the helical gear and an outer diameter of the hollow cylindrical portion being substantially equal, and an outer diameter of an inner side cylindrical portion of the helical gear being smaller than an inner diameter of the hollow cylindrical portion,
the moving rod is supported movably in the inner side cylindrical portion, with an outer diameter of the moving rod and an inner diameter of the inner side cylindrical portion being substantially equal,
the female screw is provided on an inner side surface of the hollow cylindrical portion,
a long transmission hole is provided in an inner side cylindrical portion in the moving direction of the moving rod, with the elastic engaging nail being elastically engaged with the female screw through the transmission hole,
the moving rod is moved while being synchronously rotated with the helical gear, and
the stopper members comprise a pin provided concentrically with the hollow cylindrical portion in the housing, and a projection portion provided in a hollow part of the moving rod with a hollow shape such that the pin is inserted in the hollow part of the moving rod so as to face the projection portion.

5. A remote control mirror for an automobile comprising:
a power unit;

a mirror unit mounted on the power unit, the mirror unit being rotated by the power unit by remote control, the power unit including:
  a housing;
  a motor housed in the housing;
  a moving rod having an elastic engaging nail, the moving rod being mounted movably in the housing and interlocked with the mirror unit; and
  a deceleration mechanism and a moving mechanism provided between the motor and the moving rod for moving the moving rod by the drive of the motor for tilting the mirror unit; and
fall-off preventing units for preventing fall-off of the moving rod from another member, the fall-off preventing units provided between the moving rod and the another member, the fall-off preventing units abutting against each other when the moving rod is located at a most advanced position, one of the fall-off preventing units being a part of the elastic engaging nail.

6. A remote control mirror for an automobile comprising:
a power unit;
a mirror unit mounted on the power unit, the mirror unit being rotated by the power unit by remote control, the power unit including:
  a housing;
  a motor housed in the housing;
  a moving rod mounted movably in the housing and interlocked with the mirror unit;
  a deceleration mechanism and a moving mechanism provided between the motor and the moving rod for moving the moving rod by the drive of the motor for tilting the mirror unit, and
fall-off preventing units for preventing fall-off of the moving rod from another member, the fall-off preventing units provided between the moving rod and the another member, the fall-off preventing units abutting against each other when the moving rod is located at a most advanced position, wherein
  the moving mechanism comprises a female screw provided in the housing, and an elastic engaging nail provided in the moving rod such that the elastic engaging nail is elastically engaged with the female screw,
  the deceleration mechanism comprises a hollow double cylindrical shaped helical gear such that the helical gear is mounted rotatably and unmovably in a moving direction of the moving rod on a hollow cylindrical portion provided in the housing, with an inner diameter of an outer side cylindrical portion of the helical gear and an outer diameter of the hollow cylindrical portion being substantially equal, and an outer diameter of an inner side cylindrical portion of the helical gear being smaller than an inner diameter of the hollow cylindrical portion,
  the moving rod is supported movably in the inner side cylindrical portion, with an outer diameter of the moving rod and the inner diameter of an inner side cylindrical portion being substantially equal,
  the female screw is provided on an inner side surface of the hollow cylindrical portion,
  a long transmission hole is provided in the inner side cylindrical portion in the moving direction of the moving rod, with the elastic engaging nail being elastically engaged with the female screw through the transmission hole, and
  the moving rod is moved while being synchronously rotated with the helical gear.

7. The remote control mirror according to claim 5, wherein the fall-off preventing units comprise a step portion provided in the moving rod and a protruding portion provided in another member such that the step portion and the protruding portion face each other with respect to the moving direction of the moving rod.

8. The remote control mirror according to claim 6, wherein
  the moving mechanism comprises a female screw provided in the housing, and an elastic engaging nail provided in the moving rod such that the elastic engaging nail is elastically engaged with the female screw,
  the deceleration mechanism comprises a hollow double cylindrical shaped helical gear such that the helical gear is mounted rotatably and unmovably in a moving direction of the moving rod on a hollow cylindrical portion provided in the housing, with an inner diameter of an outer side cylindrical portion of the helical gear and an outer diameter of the hollow cylindrical portion being substantially equal, and an outer diameter of an inner side cylindrical portion of the helical gear being smaller than an inner diameter of the hollow cylindrical portion,
  the moving rod is supported movably in the inner side cylindrical portion, with an outer diameter of the moving rod and an inner diameter of the inner side cylindrical portion being substantially equal,
  the female screw is provided on an inner side surface of the hollow cylindrical portion,
  a long transmission hole is provided in the inner side cylindrical portion in the moving direction of the moving rod, with the elastic engaging nail being elastically engaged with the female screw through the transmission hole, and
  the moving rod is moved while being synchronously rotated with the helical gear, and
  the fall-off preventing units comprise a step portion provided in the elastic engaging nail and a protruding portion provided in the transmission hole of the helical gear such that the step portion and the protruding portion face each other with respect to the moving direction of the moving rod.

9. A remote control mirror comprising:
a power unit;
a mirror unit mounted on the power unit, the mirror unit being rotated by the power unit by remote control in the right and left direction and the up and down direction, the power unit including:
  a housing;
  a motor for the right and left direction and a motor for the up and down direction housed in the housing;
  a moving rod for the right and left direction and a moving rod for the up and down direction mounted movably in the housing and interlocked with the mirror unit;
  a deceleration mechanism for the right and left direction, a deceleration mechanism for the up and down direction;
  a moving mechanism for the right and left direction and a moving mechanism for the up and down direction provided between the motor for the right and left direction and the motor for the up and down direction, and the moving rod for the right and the left direction and the moving rod for the up and down direction for moving the moving rod for the right and left direction and the moving rod for the up and down direction by the drive of the motor for the right and left direction and the motor for the up and down direction for tilting the mirror unit in the right and left direction and the up and down direction, the moving mechanism for the right and left direction and the moving mechanism for the up and down direction including:

a female screw for the right and left direction and a female screw for the up and down direction provided in the housing; and an elastic engaging nail for the right and left direction and an elastic engaging nail for the up and down direction provided in the moving rod for the right and left direction and the moving rod for the up and down direction such that the elastic engaging nail for the right and left direction and the elastic engaging nail for the up and down direction are elastically engaged with the female screw for the right and left direction and the female screw for the up and down direction;

first stopper members for the right and left direction and a second stopper members for the up and down direction, the first stopper members and the second stopper members provided between the housing and the moving rod for the right and left direction and the moving rod for the up and down direction, the first stopper members abutting against each other and the second stopper members abutting against each other before the moving rod for the right and left direction and the moving rod for the up and down direction are located at a most receded position such that the elastic engagement between the female screw for the right and left direction and the female screw for the up and down direction and the elastic engaging nail for the right and left direction and the elastic engaging nail for the up and down direction is in a state capable of clutch slipping; and first fall-off preventing units for the right and left direction and second fall-off preventing units for the up and down direction provided between the moving rod for the right and left direction and the moving rod for the up and down direction and another member, the first fall-off preventing units abutting against each other and the second fall-off preventing units abutting against each other when the moving rod for the right and left direction and the moving rod for the up and down direction are located at a most advanced position for preventing fall-off of the moving rod for the right and left direction and the moving rod for the up and down direction from the another member.

10. The remote control mirror according to claim 9, wherein the deceleration mechanism for the right and left direction and the deceleration mechanism for the up and down direction comprise a hollow double cylindrical shaped helical gear for the right and left direction and a helical gear for the up and down direction such that the helical gear for the right and left direction and the helical gear for the up and down direction are mounted rotatably and unmovably in a moving direction of the moving rod on a hollow cylindrical portion for the right and left direction and a hollow cylindrical portion for the up and down direction provided in the housing, with an inner diameter of an outer side cylindrical portion of the helical gear for the right and left direction and the helical gear for the up and down direction and an outer diameter of the hollow cylindrical portion for the right and left direction and the hollow cylindrical portion for the up and down direction being substantially equal, and an outer diameter of an inner side cylindrical portion of the helical gear for the right and left direction and the helical gear for the up and down direction being smaller than an inner diameter of the hollow cylindrical portion for the right and left direction and the hollow cylindrical portion for the up and down direction, the moving rod for the right and left direction and the moving rod for the up and down direction are supported movably in the inner side cylindrical portion for the right and left direction and the inner side cylindrical portion for the up and down direction, with an outer diameter of the moving rod for the right and left direction and the moving rod for the up and down direction and an inner diameter of the inner side cylindrical portion for the right and left direction and the inner side cylindrical portion for the up and down direction being substantially equal, the female screw for the right and left direction and the female screw for the up and down direction are provided on an inner side surface of the hollow cylindrical portion for the right and left direction and the hollow cylindrical portion for the up and down direction, a transmission hole for the right and left direction and a transmission hole for the up and down direction are provided in the inner side cylindrical portion for the right and left direction and the inner side cylindrical portion for the up and down direction in the moving direction of the moving rod for the right and left direction and the moving rod for the up and down direction, with the elastic engaging nail for the right and left direction and the elastic engaging nail for the up and down direction being elastically engaged with the female screw for the right and left direction and the female screw for the up and down direction through the transmission hole for the right and left direction and the transmission hole for the up and down direction, and the moving rod for the right and left direction and the moving rod for the up and down direction are moved while being synchronously rotated with the helical gear for the right and left direction and the helical gear for the up and down direction.

11. The remote control mirror according to claim 9, wherein the first stopper members for the right and left direction and the second stopper members for the up and down direction comprise a pin for the right and left direction and a pin for the up and down direction provided in the housing, and a projection portion for the right and left direction and a projection portion for the up and down direction provided in a hollow part of the moving rod for the right and left direction and the moving rod for the up and down direction with a hollow shape such that the pin for the right and left direction and the pin for the up and down direction are inserted in the hollow portions of the moving rod for the right and left direction and the moving rod for the up and down direction so as to face the projection portion for the right and left direction and the projection portion for the up and down direction with respect to the moving direction of the moving rod for the right and left direction and the moving rod for the up and down direction.

12. The remote control mirror according to claim 9, wherein the first fall-off preventing units for the right and left direction and the second fall-off preventing units for the up and down direction comprise a step portion for the right and left direction and a step portion for the up and down direction provided in the elastic engaging nail for the right and left direction and the elastic engaging nail for the up and down direction and a protruding portion for the right and left direction and a protruding portion for the up and down direction provided in the transmission hole for the right and left direction and the transmission hole for the up and down direction such that the step portion for the right and left direction and the step portion for the up and down direction and the protruding portion for the right and left direction and the protruding portion for the up and down direction face each other with respect to the moving direction of the moving rod for the right and left direction and the moving rod for the up and down direction.

13. The remote control mirror according to claim 9, wherein the deceleration mechanism for the right and left direction and the deceleration mechanism for the up and down direction comprise a hollow double cylindrical shaped helical gear for the right and left direction and a helical gear for the up and down direction such that the helical gear for the right and left direction and the helical gear for the up and down direction are mounted rotatably and unmovably in a moving direction of the moving rod on a hollow cylindrical portion for the right and left direction and a hollow cylindrical portion for the up and down direction provided in the housing, with an inner diameter of an outer side cylindrical portion of the helical gear for the right and left direction and the helical gear for the up and down direction and an outer diameter of the hollow cylindrical portion for the right and left direction and the hollow cylindrical portion for the up and down direction being substantially equal, and an outer diameter of an inner side cylindrical portion of the helical gear for the right and left direction and the helical gear for the up and down direction being smaller than an inner diameter of the hollow cylindrical portion for the right and left direction and the hollow cylindrical portion for the up and down direction, the moving rod for the right and left direction and the moving rod for the up and down direction are supported movably in the inner side cylindrical portion for the right and left direction and the inner side cylindrical portion for the up and down direction, with an outer diameter of the moving rod for the right and left direction and the moving rod for the up and down direction and an inner diameter of the inner side cylindrical portion for the right and left direction and the inner side cylindrical portion for the up and down direction being substantially equal, the female screw for the right and left direction and the female screw for the up and down direction are provided on an inner side surface of the hollow cylindrical portion for the right and left direction and the hollow cylindrical portion for the up and down direction, a transmission hole for the right and left direction and a transmission hole for the up and down direction are provided in the inner side cylindrical portion for the right and left direction and the inner side cylindrical portion for the up and down direction in the moving direction of the moving rod for the right and left direction and the moving rod for the up and down direction, with the elastic engaging nail for the right and left direction and the elastic engaging nail for the up and down direction being elastically engaged with the female screw for the right and left direction and the female screw for the up and down direction through the transmission hole for the right and left direction and the transmission hole for the up and down direction, and the moving rod for the right and left direction and the moving rod for the up and down direction are moved while being synchronously rotated with the helical gear for the right and left direction and the helical gear for the up and down direction, the first stopper members for the right and left direction and second stopper members for the up and down direction comprise a pin for the right and left direction and a pin for the up and down direction provided in the housing, and a projection portion for the right and left direction and a projection portion for the up and down direction are provided in a hollow part of the moving rod for the right and left direction and the moving rod for the up and down direction with a hollow shape such that the pin for the right and left direction and the pin for the up and down direction are inserted in the hollow part of the moving rod for the right and left direction and the moving rod for the up and down direction so as to face the projection portion for the right and left direction and the projection portion for the up and down direction with respect to the moving direction of the moving rod for the right and left direction and the moving rod for the up and down direction, and the first fall-off preventing units for the right and left direction and the second fall-off preventing units for the up and down direction comprise a step portion for the right and left direction and a step portion for the up and down direction provided in the elastic engaging nail for the right and left direction and the elastic engaging nail for the up and down direction and a protruding portion for the right and left direction and a protruding portion for the up and down direction provided in the transmission hole for the right and left direction and the transmission hole for the up and down direction such that the step portion for the right and left direction and the step portion for the up and down direction and the protruding portion for the right and left direction and the protruding portion for the up and down direction face each other with respect to the moving direction of the moving rod for the right and left direction and the moving rod for the up and down direction.

* * * * *